United States Patent Office 3,357,952
Patented Dec. 12, 1967

3,357,952
POLYMERIZATION OF FORMALDEHYDE USING A PHOSPHOAMINEESTER CATALYST
François Meiller, Palaiseau, France, assignor to Produits Chimiques Pechiney St. Gobain, Neuilly-sur-Seine, France
No Drawing. Filed Jan. 28, 1964, Ser. No. 340,795
Claims priority, application France, Jan. 29, 1963, 922,989
18 Claims. (Cl. 260—67)

This invention relates to the polymerization of formaldehyde by catalysis, and to a novel method, the novel reaction mass, and to the product produced.

Formaldehyde has been polymerized in solution and in vapor phase. The catalysts employed have been tertiary and other amines, phosphines, organic peroxides, and quaternary ammonium salts. The products produced have had in molecular weights a wide diversity, the proportion of low molecular weights in a polymer being often so great that the products were frangible. Also, the stabilization of those polymers as by esterification sometimes proved to be difficult.

It is an object of this invention to improve the manufacture of polyformaldehyde, to polymerize formaldehyde by a new and more efficient method either in liquid or in vapor phase, and to polymerize formaldehyde by means of novel catalysts.

The objects of the invention are accomplished, generally speaking, by a method of polymerizing formaldehyde which comprises bringing anhydrous formaldehyde into contact with a phosphoamine in which the phosphorous is at least trivalent, the first valence being coupled by oxygen to one of the group consisting of aminoalkyl and aminoaryl, each of the second and third valences being coupled to one of the group consisting of oxyaminoalkyl, oxyaminoaryl, oxyalkyl, oxyaryl, alkyl, and aryl, and the fourth and fifth valences being coupled when present to one of the group consisting of O and S.

The phosphoamines, generally speaking, have the formula

in which each of R, R' and R" is one of a group consisting of oxyaminoalkyl, oxyaminoaryl, oxyalkyl, and oxyaryl, at least one oxyamino radical being present, and X being absent when P has a valence of 3 and one of the group consisting of oxygen and sulfur when P has a valence of 5.

The process of this invention produces high molecular weight polymers of formaldehyde which are easy to stabilize. The novelty of the process resides in polymerizing formaldehyde in the presence of catalysts which contain in the molecule an atom of tri- or pentavalent phosphorous and one or more amine groups. The invention is particularly directed to a process of polymerization of formaldehyde in which the catalyst is an ester of aminoalcohols or aminophenols with acids which contain tri- or pentavalent phosphorous.

The structure of the tri- and pentavalent catalysts correspond to the same formula except that when phosphorous is pentavalent the fourth and fifth valences are occupied by oxygen or sulfur.

The preferred catalysts fall into two groups of which the first are di or tri valent phosphorous, or phosphoric, esters of aminoalcohols or aminophenols, the other acid groups being esterified by alcohols or phenols which do not have amino groups. These catalysts correspond to the formulas

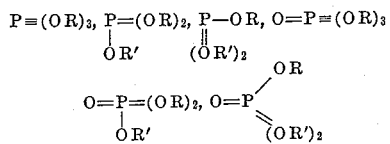

in which R is aminoalkyl or is aminoaryl and R' is alkyl or aryl. The second of these preferred groups are phosphonous or phosphinous, or phosphonic, or phosphinic mono or diesters of aminoalcohols or aminophenols, the other acid groups being esterified or not by an alcohol or phenol which contains no amino group. These catalysts have the following formulas:

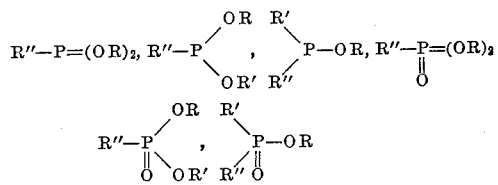

in which R is an aminoalkyl or aminoaryl group and R' and R" are alkyl or aryl, alike or different.

The amine group may have alkyl substituents and the =O in the formulas herein may be wholly or partly replaced by sulfur.

Catalysts of these groups which have proved to be especially efficient are tris (diethylamino-ethyl) phosphite; butyl, bis (diethylaminoethyl) phosphite; bisphenyl, para-amino-phenyl phosphite; tris (aminoethyl) phosphate; butyl, bisaminophenyl phosphate; dicresyl, diethylamino-ethyl phosphate; and the compositions of the formulas:

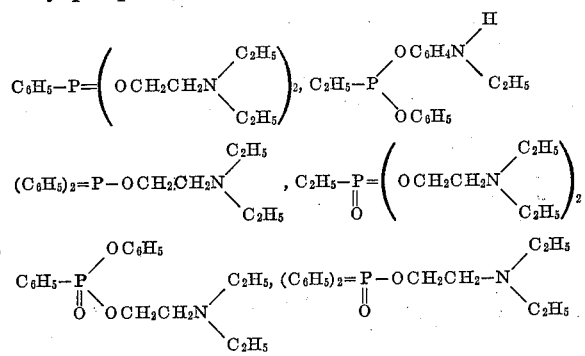

These catalysts may be used alone, in mixtures, or in admixture with one or any number of catalysts of known types. They are equally useful in liquid phase and in vapor phase polymerizations. Their use in liquid phase is advantageous to operational ease, and to purity of product.

The novel catalysts are used in catalytic quantities which are, for operations in liquid phase, from .0001 to .02 mole for each 1000 cc. of solvent, and from .01 to 5 moles per 1000 moles of monomer when the polymerization is in gas phase.

The formaldehyde may be used without regard to its method of preparation, either directly from methanol, or by passing through the stage of hemiformal, or when the installations used are small, by the thermal decomposition of alphapolyoxymethylene followed by passing the monomer through several desiccators at −20° C., which removes the water contained in the monomeric formaldehyde. It is important in the new process to operate in a substantially anhydrous state, that is to say, that the amount of water present in the formaldehyde should not substantially exceed 1000 parts per million, for operations in liquid phase, and should not substantially exceed about 500 parts per million of water in the monomer when polymerization is in vapor phase.

When polymerization is in liquid phase, the catalyst is dissolved or suspended in the liquid reaction medium, which may be any of the hydrocarbon solvents or mixtures of them, and for that matter, any liquid which is chemically inert to formaldehyde and its polymers. The gaseous monomer is bubbled through the catalyst solution. In ordinary practice the solvent should be at least three times the weight of the monomer introduced; in this way the polymer precipitates, and the polymerization proceeds efficiently.

When operation is in vapor phase, the process described in French Patent No. 1,285,909 can be followed satisfactorily. In that process, the polymerization is carried out in gas phase on the surface of a body of finely divided polymer resulting from the same reaction.

In both cases the flow of monomer is established at an efficient rate. When the monomer comes from the pyrolysis of alpha-polyoxymethylene, the rate of production is controlled by regulating the intensity of the heating.

The process proceeds well at atmospheric pressure but it is possible to operate under lesser or greater pressure. Optimum conditions of pressure may be readily established as a function of the vapor tensions of the materials in the reaction mass at the temperature employed.

The temperature of polymerization in liquid phase is usually between −100° and +120° C., more advantageously between −80 and +70° C., and best between −15 and +50° C. In vapor phase the broad range is between −90° and +120° C., the more advantageous range is between −20 and +120° C. and the best range is between −15 and +80° C. In operations in liquid phase the catalyst is dissolved or suspended in the solution, whereas in gas phase operations the catalyst is preferably introduced as a gas or vapor or, when used in the solid state, mixed intimately with the granular polymer in the bottom of the reaction chamber. At the end of the operation the catalyst is eliminated either by washing with appropriate solvent or during the stabilization of the ends of the chains of polyformaldehyde by acetylation or etherification, which generally followed polymerization.

The polymers are of high molecular weight, are easily stabilized and are of high quality with or without the addition of pigments, antioxidants, plasticizers, and stabilizers. The following examples illustrate the invention without introducing any limitation on the generality of that which is elsewhere herein stated:

*Example 1*

The reaction vessel was a glass flask having four openings. The flask was provided with an agitator, with refrigerating means, with a thermometer, and it was connected to a conduit for gaseous formaldehyde. 1000 cc. of heptane were distilled on sodium and put into the flask. 0.5 grm. of the compound of the formula

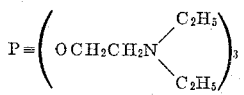

were dissolved in it. Gaseous monomeric formaldehyde was produced by the thermal decomposition of alpha-polyoxymethylene, was passed through a cooling system at −20° C. and admitted to the solution at 0° C. After four hours, flow having been at 50 grms. per hour, the flow of monomer was stopped. The reaction mass was removed and the product separated and washed in acetone. There were 185 grms. of a polymer which was insoluble in an aqueous molar solution of sodium sulfite at 20° C. The ends of the chain were stabilized by acetylation, a known process, producing a polymer which had a constant speed of thermal degradation at 222° C. of 0.15% per minute. This is also called $k_{222}$ which represents the percentage of losses of weight per minute with respect to the quantity of polymer remaining.

*Example 2*

Operating as in Example 1 with 1000 cc. of dry hexane as the solvent and 1 gr. of the composition of the formula

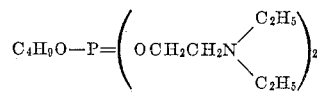

as the catalyst, the solution being maintained at 0° C., 80 g. per hour of formaldehyde gas were bubbled through the liquid for four hours. After separation by decantation and washing in acetone there were 290 grms. of a polymer which was insoluble in an aqueous molar solution of sodium sulfite at 20° C. and which, after etherification, had a $k_{222}$ of .12% per minute.

*Example 3*

Operation as in Example 1 but with 1000 cc. of petroleum ether in which there were dissolved the .1 gr. of the compound represented by the formula

kept at 0° C., monomeric formaldehyde was introduced at 60 grms. per hour for four hours. The temperature at the end of this time was about 25° C. After separation the product was a quantative yield of a polymer which, after washing with ether was insoluble in an aqueous molar solution of sodium sulfite at 20° C. This product, after acetylation, had a $k_{222}$ of .21% per minute.

*Example 4*

A metallic reactor constituted of a horizontal metal cylinder within which was an agitator of blade type rotating the axis of the reactor, there were introduced 400 grms. of unstabilized polymer from Example 3. The temperature of the reactor was 20° C. and gaseous formaldehyde was admitted at 60 grms. per hour. The catalyst was mixed as a gas with the formaldehyde inside the reactor. The catalyst was

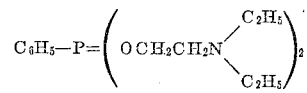

It was introduced to the reactor in a current of nitrogen at a rate of .01 grm. per hour. After 5 hours the interior temperature was 45° C., the flow of formaldehyde and nitrogen was stopped and 700 grms. of polymer were obtained. The polymer was insoluble in an aqueous molar solution of sodium sulfite at 20° C. Its properties were the same as those of the product of Example 3.

*Example 5*

In the same apparatus as in Example 1 there was dissolved .5 g. of the composition of the formula

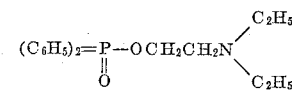

In 1000 cc. of the solvent called "Decalin" the reaction mass was at 0° C. and 40 g. per hour of purified anhydrous formaldehyde were bubbled through the liquid for 5 hours. After isolating the precipitate and washing with acetone there were 200 g. of polymer which was insoluble in an aqueous molar solution of sodium sulfite at 20° C. After etherification the polymer had a $k_{222}$ of .15% per minute.

Example 6

Operating as in Example 1 with 1000 cc. of heptane and 1 g. of the composition of the formula

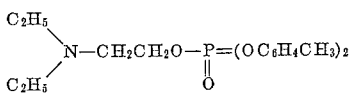

temperature being at −15° C., 40 g. per hour of purified monomeric formaldehyde were introduced for 5 hours. After separation and washing in heptane 160 g. of polymer were recovered. This was insoluble in an aqueous molar solution of sodium sulfite at 20° C. After acetylation the polymer was heated and pressed to form films having a thickness on the order of photographic films which were tested on a bending machine and withstood extensive bending without breaking.

The high polymers of this invention have chain lengths on the order upward of 50,000. The chain lengths within a polymer are more uniform than those of the prior art, having fewer short chains. As a consequence, the polymers of this invention are less brittle, stronger, less viscous when at working temperatures such as roll mill temperatures, more flexible than prior polymers, and are more easily stabilized by standard processes of acetylating or etherifying end groups.

As many apparently widely different embodiments of the present invention may be made without departing from the spirit and scope thereof, it is to be understood that the invention is not limited to the specific embodiments.

What is claimed is:

1. A method of polymerizing formaldehyde which comprises bringing anhydrous formaldehyde into contact with a phosphoamine ester containing the linkage P—O—C in which the phosphorus is at least trivalent, the first valence being coupled by oxygen to one of the group consisting of aminoalkyl and aminoaryl, each of the second and third valences being coupled to one of the group consisting of oxyaminoalkyl, oxyaminoaryl, oxyalkyl, oxyaryl, alkyl, and aryl, and the fourth and fifth valences being coupled to at least one of the group consisting of O and S when P is pentavalent, alkyl being lower alkyl and aryl being phenyl.

2. The method of claim 1 in which the phosphoamine has the formula

in which each of R, R' and R" is one of the group consisting of oxyaminoalkyl, oxyaminoaryl, oxyalkyl and oxyaryl, at least one oxyamino radical being present, and X being absent when P has a valence of 3 and one of the group consisting of oxygen and sulfur when P has a valence of 5.

3. The method of claim 1 in which the phosphoamine has the formula

in which each of R, R', and R" is one of the group consisting of oxyaminoalkyl, oxyaminoaryl, oxyalkyl, oxyaryl, alkyl and aryl, and X being absent when P has a valence of 3 and being one of the group consisting of O and S when it has a valence of 5.

4. The method according to claim 1 in which the three primary valences are coupled to members of the group consisting of oxyaminoalkyl, oxyaminoaryl, oxyalkyl and oxyaryl.

5. The method of claim 1 in which at least one aminoorganic group bears an alkyl group attached to N.

6. The method of claim 1 in which the process is carried out in a solvent and the catalyst is between .0001 and .02 mole per 1000 cc. of solvent.

7. The method of claim 1 in which the process is carried out in vapor phase and the catalyst is .01 to 5 moles per 1000 cc. of monomer.

8. The method of claim 1 in which the temperature is maintained in the range −15 to +80° C.

9. The method of claim 1 in which the catalyst is tris (diethylaminoethyl) phosphite.

10. The method of claim 1 in which a catalyst is employed which is of the type of the amino-alkyl and amino-aryl phosphates and phosphites.

11. The method of claim 1 in which a catalyst is employed which are esters of compounds of the type of aminoalcohols and aminophenols and have formulas of the type of $P\equiv(OR)_3$;

$$P\diagup_{OR'}^{(OR)_2} \; ; P\diagup_{(OR')_2}^{OR} \; ; O=P\equiv(OR)_3; \; O=P=(OR)_2; \; \text{and} \; O=P\diagup_{(OR')_2}^{OR}$$

in which R is aminoalkyl or aminoaryl, and R' is alkyl or aryl, aryl and alkyl being as set forth in claim 1.

12. The method of claim 11 in which =O is at least partly replaced by S.

13. The method of claim 1 in which a catalyst is employed is from the group consisting of the phosphonous, phosphinous, phosphonic, and phosphinic mono and diesters of aminoalcohols and aminophenols and have formulas of the type of $$R''-P=(OR)_2; \; R''-P\diagup_{OR'}^{OR\;R'} \; ; \; \diagdown_{OR'\;R''}^{}P-OR; \; R''-P=(OR)_2$$

$$R''-P\diagup_{O\;OR'}^{OR\;R'} \; ; \text{and} \; \diagdown_{R''\;O}^{}P-OR$$

in which R is of the class of aminoalkyl and aminoaryl, and R' and R" are of the class of alkyl and aryl, as defined in claim 1.

14. The method of claim 13 in which =O is at least partly replaced by S.

15. The method of polymerizing formaldehyde which comprises bringing formaldehyde into contact with an ester containing at least trivalent phosphorus coupled to at least one alkylamine by oxygen.

16. The method of claim 15 in which the polymerization is carried out in a chemically inert solvent for the catalyst which is a non solvent for the polymer.

17. The method of claim 15 in which the polymerization is by contact of formaldehyde vapor with the catalyst on the surface of finely divided polymer.

18. The method of claim 16 in which the solvent is at least three times the weight of the monomer used.

References Cited

UNITED STATES PATENTS

| | | | |
|---|---|---|---|
| 3,173,894 | 3/1965 | Hermann et al. | 260—67 |
| 3,227,689 | 1/1966 | Van Asselt et al. | 260—67 |

FOREIGN PATENTS

| | | |
|---|---|---|
| 1,285,909 | 1/1962 | France. |

WILLIAM H. SHORT, *Primary Examiner.*

L. M. MILLER, L. M. PHYNES, *Assistant Examiners.*